(12) United States Patent
Umedu

(10) Patent No.: US 8,078,893 B2
(45) Date of Patent: Dec. 13, 2011

(54) POWER SUPPLY METHOD FOR SUPPLYING POWER TO EXTERNAL DEVICE BY SELECTING POWER SUPPLY MODE IN MEMORY ASSOCIATED WITH IDENTIFICATION INFORMATION

(75) Inventor: Hideyuki Umedu, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/727,119

(22) Filed: Mar. 18, 2010

(65) Prior Publication Data

US 2010/0306565 A1 Dec. 2, 2010

(30) Foreign Application Priority Data

May 26, 2009 (JP) .................................. 2009-125982

(51) Int. Cl.
G06F 1/32 (2006.01)
(52) U.S. Cl. ....................................... 713/320; 713/324
(58) Field of Classification Search .................. 713/320, 713/324
See application file for complete search history.

(56) References Cited

U.S. PATENT DOCUMENTS

| 5,475,271 | A | 12/1995 | Shibasaki et al. | |
| 6,345,364 | B1 * | 2/2002 | Lee | 713/324 |
| 6,782,491 | B1 * | 8/2004 | Foedlmeier et al. | 714/37 |
| 7,024,567 | B2 * | 4/2006 | Kim et al. | 713/300 |
| 7,489,974 | B2 * | 2/2009 | Numano | 700/22 |
| 7,516,345 | B2 * | 4/2009 | Choi | 713/323 |
| 2005/0144495 | A1 | 6/2005 | Nakajima et al. | |
| 2006/0035527 | A1 | 2/2006 | Numano | |
| 2007/0022311 | A1 * | 1/2007 | Park | 713/310 |

FOREIGN PATENT DOCUMENTS

| JP | 05-66864 A | 3/1993 |
| JP | 2001-117676 A | 4/2001 |
| JP | 2001-242965 A | 9/2001 |
| JP | 2004-078740 A | 3/2004 |
| JP | 2006-053748 | 2/2006 |
| JP | 2006-277346 A | 10/2006 |
| JP | 2007-087040 | 4/2007 |
| JP | 2007-233719 | 9/2007 |
| JP | 2008-205927 A | 9/2008 |
| JP | 2009-060716 A | 3/2009 |

OTHER PUBLICATIONS

Notice of Rejection mailed by Japan Patent Office on May 18, 2009 in the corresponding Japanese Patent Application No. 2009-125982.
Notice of Rejection mailed by Japan Patent Office on Aug. 10, 2010 in the corresponding Japanese Patent Application No. 2009-125982.

* cited by examiner

Primary Examiner — Chun Cao
(74) Attorney, Agent, or Firm — Knobbe Martens Olson & Bear LLP

(57) ABSTRACT

According to one embodiment, an information processor capable of supplying power to an external device includes a connector, a storage module, a receiver, a selector, and a power supply controller. The connector connects the external device to the information processor. The storage module stores identification information that identifies the external device and a power supply mode in association with each other. The power supply mode defines a condition of each element of the information processor to cause the external device to be chargeable. The receiver receives the identification information from the external device connected to the information processor. The selector selects the power supply mode stored in the storage module in association with the identification information. The power supply controller sets the element of the information processor according to the condition defined by the power supply mode.

4 Claims, 4 Drawing Sheets

FIG.2

| POWER SUPPLY MODE | USB CONTROLLER | EXTERNAL HARDWARE | POWER SOURCE CIRCUIT |
|---|---|---|---|
| MODE 0 | OFF | OFF | ON |
| MODE 1 | ON | OFF | ON |
| MODE 2 | OFF | ON | ON |
| MODE 3 | ON | ON | ON |

FIG.3

| POWER SUPPLY MODE | STATE OF USB SIGNAL LINE | |
| | CLOCK LINE | DATA LINE |
|---|---|---|
| MODE 0 | H | H |
| MODE 1 | H | L |
| MODE 2 | L | H |
| MODE 3 | L | L |

FIG.4

| USB DEVICE INFORMATION | POWER SUPPLY MODE |
|---|---|
| MOBILE TELEPHONE A | MODE 1 |
| MOBILE AUDIO PLAYER B | MODE 3 |
| MOBILE AUDIO PLAYER C | NOT AVAILABLE |
| ⋮ | ⋮ |

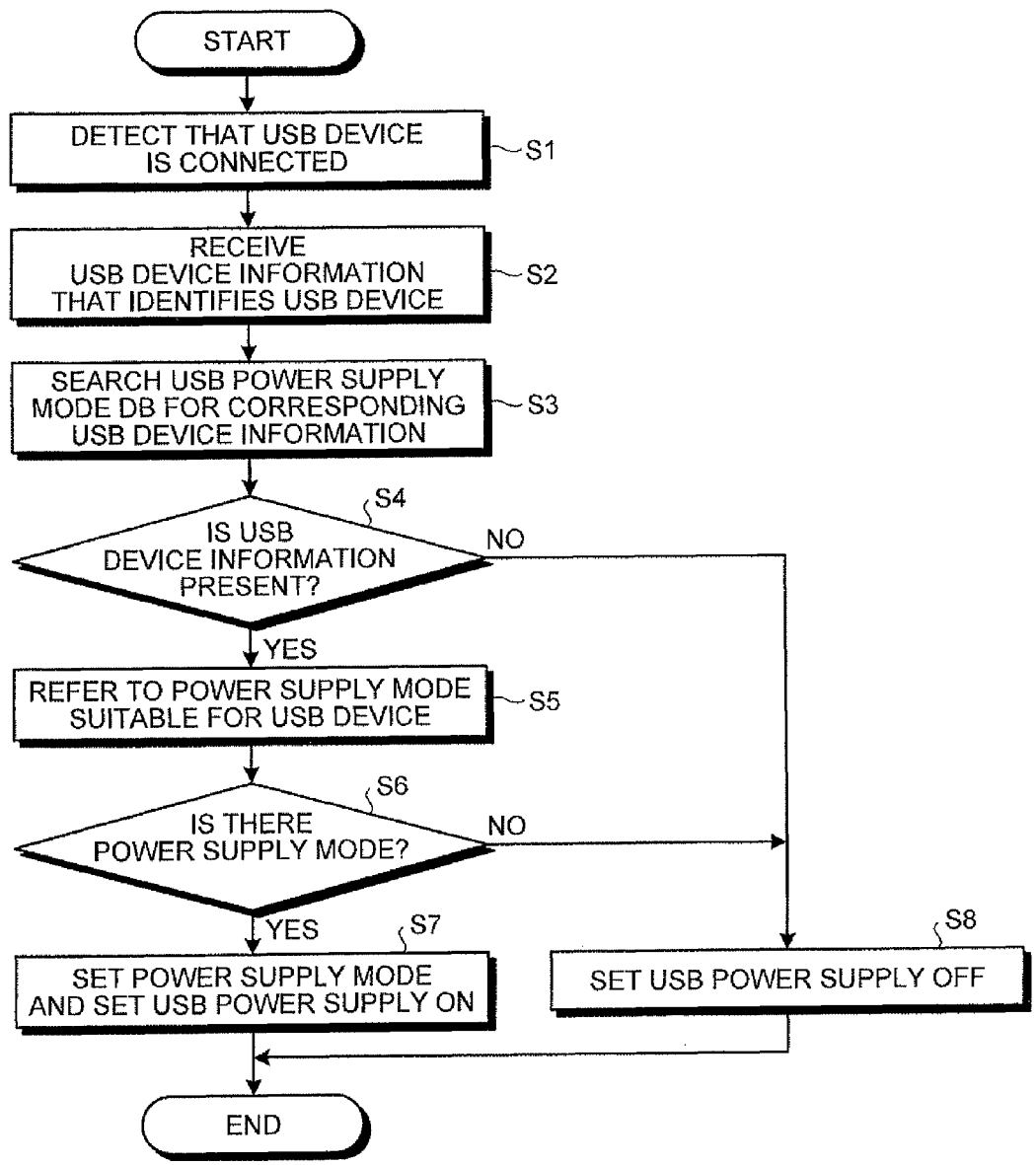

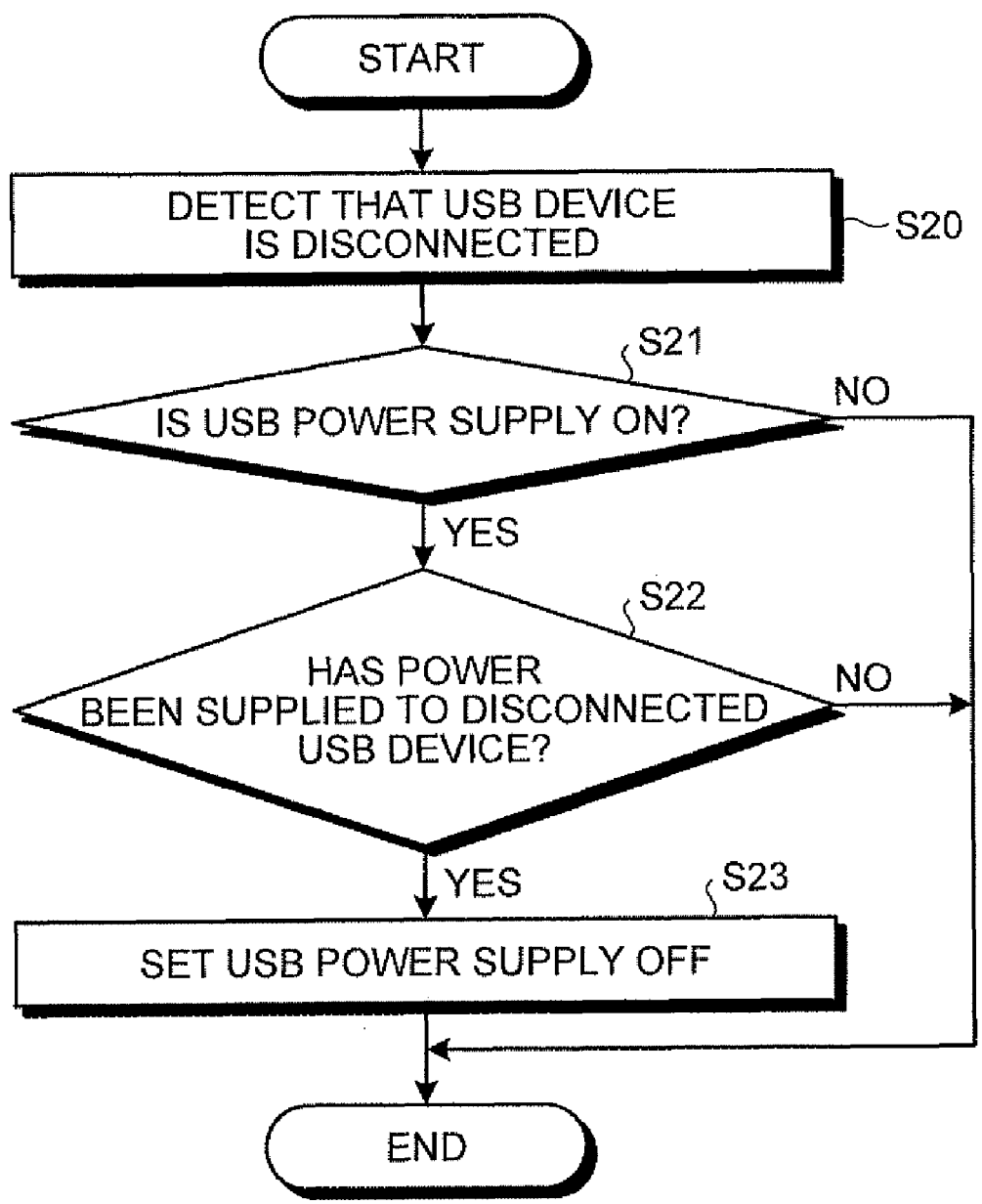

US 8,078,893 B2

POWER SUPPLY METHOD FOR SUPPLYING POWER TO EXTERNAL DEVICE BY SELECTING POWER SUPPLY MODE IN MEMORY ASSOCIATED WITH IDENTIFICATION INFORMATION

CROSS-REFERENCE TO RELATED APPLICATIONS

This application is based upon and claims the benefit of priority from Japanese Patent Application No. 2009-125982, filed on May 26, 2009, the entire contents of which are incorporated herein by reference.

BACKGROUND

1. Field

One embodiment of the invention relates to a technology to supply power to a device, and more particularly, to an information processor that supplies power to a device via a bus and a power supply method.

2. Description of the Related Art

Recent information processors including personal computers (PCs) are provided with a bus interface, such as a universal serial bus (USB) and an institute of electrical and electronic engineers (IEEE) 1394 bus, to connect to various types of devices. Such an information processor is capable of supplying power to a device through the bus interface. For example, Japanese Patent Application Publication (KOKAI) No. 2006-53748 discloses a conventional technology to supply power from an information processor to a device through a bus interface. According to the conventional technology, even if the information processor is OFF or in power saving mode, when the device is connected to the bus interface, it starts power supply to the device. The mode in which the information processor supplies power to a device (hereinafter, "power supply mode") varies depending on the device. If a wrong power supply mode is selected to supply power to a device, power may not be supplied properly to the device.

If required to select a power supply mode suitable for a device, the user needs the knowledge as well as the time to do so. This is inconvenient to the user.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is an exemplary schematic diagram of power supply modes stored in a storage module in the embodiment;

FIG. 3 is an exemplary schematic diagram of power supply modes stored in external hardware in the embodiment;

FIG. 4 is an exemplary schematic diagram of data structure of a USB power supply mode database in the embodiment;

FIG. 5 is an exemplary flowchart of the operation of the computer when a USB device is connected thereto in the embodiment; and FIG. 6 is an exemplary flowchart of the operation of the computer when the USB device is disconnected therefrom in the embodiment.

DETAILED DESCRIPTION

Figure 1:
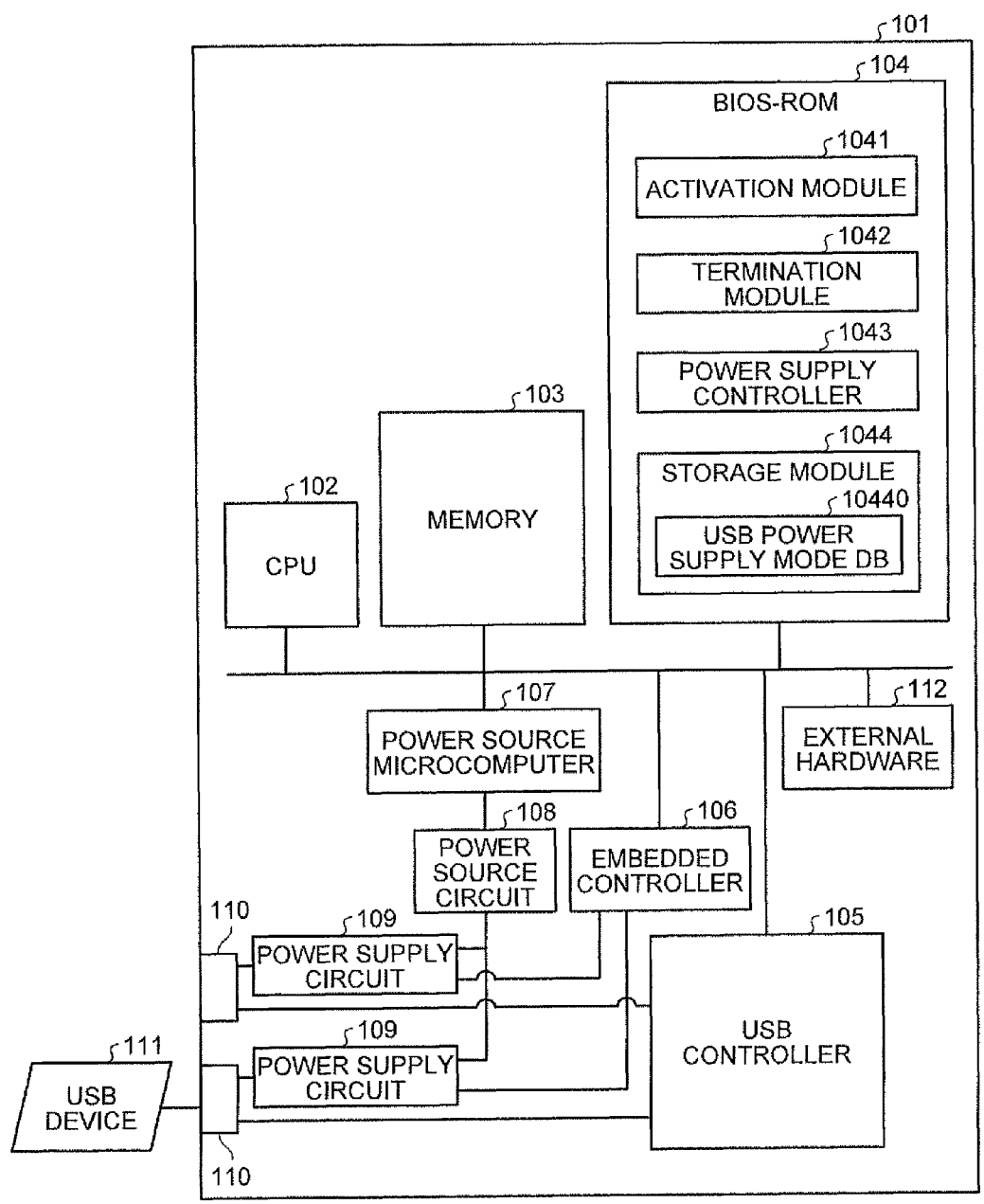
FIG. 1 is an exemplary block diagram of a computer according to an embodiment of the invention.

Various embodiments according to the invention will be described hereinafter with reference to the accompanying drawings. In general, according to one embodiment of the invention, an information processor capable of supplying power to an external device comprises a connector, a storage module, a receiver, a selector, and a power supply controller. The connector is configured to connect the external device to the information processor, the storage module is configured to store identification information that identifies the external device and a power supply mode in association with each other. The power supply mode defines a condition of each element of the information processor to cause the external device to be chargeable. The receiver is configured to receive the identification information from the external device connected to the information processor. The selector is configured to select the power supply mode stored in the storage module in association with the identification information. The power supply controller is configured to set the element of the information processor according to the condition defined by the power supply mode.

According to another embodiment of the invention, there is provided a power supply method applied to an information processor. The information processor comprises a connector configured to connect an external device to the information processor, a storage module configured to store identification information that identifies the external device and a power supply mode in association with each other, the power supply mode defining a condition of each element of the information processor to cause the external device to be chargeable, a receiver, a selector, and a power supply controller. The power supply method comprises: the receiver receiving the identification information from the external device connected to the information processor; the selector selecting the power supply mode stored in the storage module in association with the identification information; and the power supply controller setting the element of the information processor according to the condition defined by the power supply mode.

FIG. 1 illustrates an example of a configuration of a computer 101 according to an embodiment of the invention. As illustrated in FIG. 1, the computer 101 comprises a central processing unit (CPU) 102, a memory 103, a BIOS-ROM 104, a universal serial bus (USB) controller 105, an embedded controller 106, a power source microcomputer 107, a power source circuit 108, power supply circuits 109, USB ports 110, and external hardware 112. While a USB device 111 is described herein as a device that is supplied with power from the computer 101, it is not so limited, and other devices such as, for example, an institute of electrical and electronic engineers (IEEE) 1394 device may be supplied with power from the computer 101. Incidentally, power supply to the USB device 111 will be referred to as "USB power supply" or, simply, "power supply".

The CPU 102 controls the overall operation of the computer 101. The CPU 102 loads a system basic input-output system (BIOS) stored in the BIOS-ROM 104 into the memory 103 and executes it to control various types of hardware. The CPU 102 also loads an operating system (OS) stored in a hard disk (not illustrated) or the like into the memory 103 to execute the OS. The CPU 102 executes various types of application programs other than the system BIOS and the OS.

The memory 103 is a main memory where the CPU 102 loads the system BIOS stored in the BIOS-ROM 104 and the OS and the application programs stored in the hard disk (not illustrated) or the like to execute them.

The BIOS-ROM 104 is a memory that stores the system BIOS to specify various settings mainly for hardware.

The system BIOS comprises an activation module 1041, a termination module 1042, a power supply controller 1043, and a storage module 1044 as functional modules.

The storage module 1044 stores various settings for USB power supply. More specifically, the storage module 1044 stores current threshold, power supply mode effective for USB power supply, and supply current value with respect to each power supply mode. The storage module 1044 also stores settings of the power supply mode with respect to each of the USB ports 110.

The power supply mode defines a combination of the conditions of the modules or elements of the computer 101 including the USB controller 105, the power source circuit 108, and the external hardware 112 to bring the USB device 111 in the state (charge mode) where the USB device 111 is chargeable. For example, the power supply mode defines a combination of the conditions (ON/OFF or H (high)/L (low)) of control signals for the elements of the computer 101 including the USB controller 105, the power source circuit 108, and the external hardware 112.

FIG. 2 illustrates examples of the power supply modes stored in the storage module 1044. In the example of FIG. 2, each of the power supply modes defines a combination of the conditions of the USB controller 105, the power source circuit 108, and the external hardware 112. More specifically, if the power supply mode is set to Mode 0, the power source circuit 108 is set for USP power supply, while the USB controller 105 and the external hardware 112 are not set for USP power supply. In Mode 1, the USB controller 105 and the power source circuit 108 are set for USP power supply. In Mode 2, the power source circuit 108 and the external hardware 112 are set for USP power supply. In Mode 3, the USB controller 105, the power source circuit 108, and the external hardware 112 are set for USP power supply. The external hardware 112 is included in the combination that determines the power supply mode because by only hardware that controls normal power supply, such as the BIOS-ROM 104, the USB controller 105, and the power source circuit 108, power may not be supplied effectively to the USB device 111.

While the conditions of the elements to set the power supply mode are described herein as ON and OFF, this is by way of example only. In the case of the external hardware 112, for example, as illustrated in FIG. 3, signal levels of a signal line 1 (clock line) and a signal line 2 (data line) are set to H (high) or L (low) in association with each of the power supply modes.

As described above, according to the embodiment, there are a plurality of power supply modes. This is because the settings of the computer 101 required to bring a USB device in the charge mode vary depending on the USB device.

The storage module 1044 further stores a USB power supply flag that indicates whether to enable USB power supply. When USB power supply is enabled (ON), the USB power supply flag indicates "1". On the other hand, when USB power supply is disabled (OFF), the USB power supply flag indicates "0". The storage module 1044 comprises a USB power supply mode database (DB) 10440. The USB power supply mode DB 10440 stores USB device information that identifies a USB device and an optimum power supply mode to supply power to the USB device in association with each other. FIG. 4 illustrates an example of data structure of the USB power supply mode DB 10440. In the example of FIG. 4, the USB power supply mode DB 10440 stores, as the USB device information that identifies each USB device, "mobile telephone A", "mobile audio player B", "mobile audio player C", and the like. As optimum power supply mode to supply power to the devices, the USB power supply mode DB 10440 stores Mode 1 for "mobile telephone A" and Mode 3 for "mobile audio player B". Power supply is not available to "mobile audio player C", and therefore the USB power supply mode DB 10440 stores no power supply mode for "mobile audio player C".

Referring back to FIG. 1, The USB ports 110 connect the power supply circuits 109 and the USB device 111.

When the USB device 111 is connected to the USB port 110 and thereby connected to the computer 101, the USB controller 105 detects a signal indicating the connection of the USB device 111. Similarly, when the USB device 111 is disconnected from the USB port 110 and thereby disconnected from the computer 101, the USB controller 105 detects the event. Further, the USB controller 105 controls the transmission/receipt of various commands and data to/from the USB device 111. In the embodiment, the USB controller 105 receives the USB device information described above and sends it to the power supply controller 1043.

The embedded controller 106 manages the power source of the computer 101. More specifically, when the power supply controller 1043, which will be described later, cannot select an optimum power supply mode for the USB device 111 connected to the USB port 110, the embedded controller 106 disables USB power supply to the USB port 110 by, for example, disconnecting between the power supply circuit 109 and the USB port 110.

The power source microcomputer 107 supplies supply current to the elements of the computer 101 including the power supply circuits 109 as well as monitoring the conditions of the voltage of the elements. When a power button (not illustrated) is pressed and the power source circuit 108 detects the signal, the power source microcomputer 107 instructs the activation module 1041 of the BIOS-ROM 104 to perform an activation process.

When the power button (not illustrated) is pressed, the power source circuit 108 detects the signal. The power source circuit 108 controls the power source of the computer 101.

The power supply circuits 109 are circuits to supply power to the USB port 110 even when the termination module 1042 terminates various types of hardware.

The USB device 111 is a medium capable of data transmission/receipt and communication according to the USB standard. Examples of the USB device 111 include a flash memory, a hard disk, a mobile telephone, a mobile audio player, and the like. The USB device 111 stores the USB device information that identifies it as one of the above devices. When inserted into the USB port 110 and connected to the computer 101, the USB device 111 transmits the USB device information to the USB controller 105.

External circuits other than hardware that usually controls the power source, such as the BIOS-ROM 104, the USB controller 105, the power source circuit 108, and the like, are referred herein to as the external hardware 112.

In the following, a description will be given of the system BIOS stored in the BIOS-ROM 104. As illustrated in FIG. 1, the system. BIOS functionally comprises the activation module 1041, the termination module 1042, the power supply controller 1043, and the storage module 1044.

The activation module 1041 activates various types of hardware in the computer 101 according to an instruction from the power source microcomputer 107 to wake up the computer 101. In other words, the activation module 1041 brings the computer 101 in sleep mode where it is not in operation but power is supplied to the USB controller 105 and the power supply circuits 109 into active mode where it is in operation. More specifically, the activation module 1041 initializes various types of hardware in the computer 101. That is, for example, the activation module 1041 initializes the settings of video graphics array (VGA), integrated device electronics (IDE), and the like. After performing the initialization, the activation module 1041 boots up the OS so that the user can use the computer 101.

The termination module 1042 terminates various types of hardware in the computer 101 according to an instruction from an application such as the OS to shut down the computer 101. In other words, the activation module 1041 brings the computer 101 in active mode where it is in operation into sleep mode where it is not in operation but power is supplied to the USB controller 105 and the power supply circuits 109. More specifically, when an application such as the OS is shut down, the termination module 1042 saves the settings of VGA, IDE, and the like.

The power supply controller 1043 receives the USB device information via the USB controller 105. The power supply controller 1043 refers to the USB power supply mode DB 10440 based on the USB device information to select an optimum power supply mode to supply power to the USB device 111. The power supply controller 1043 then sets the value of the USB power supply flag stored in the storage module 1044 to "1" to enable USB power supply. At the same time, the power supply controller 1043 sets the conditions of the USB controller 105, the power source circuit 108, and the external hardware 112 according to the selected power supply mode. If not able to select an optimum power supply mode to supply power to the USB device 111, the power supply controller 1043 disables power supply to the USB port 110 through the embedded controller 106.

The operation of the computer 101 will be described below. First, a description will be given of the operation of the computer 101 when the USB device 111 is connected thereto with reference to FIG. 5.

When the USB device 111 is inserted into the USB port 110 and thereby connected to the computer 101, the USB controller 105 detects a signal indicating that the USB device 111 is connected to the computer 101 (S1). The computer 101 receives the USB device information that identifies the USB device 111 from the USB device 111 (S2). Thereafter, the power supply controller 1043 refers to the USB power supply mode DB 10440 to search for the USB device information received at S2, thereby determining whether the USB device information is present in the USB power supply mode DB 10440 (S3). When it is determined that the USB device information is present (Yes at S4), the computer 101 refers to a power supply mode associated with the USB device information (S5), and determines whether there is the power supply mode (S6). When it is determined that there is the power supply mode (Yes at S6), the computer 101 selects the power supply mode as an optimum power supply mode to supply power to the USB device 111. The computer 101 sets the USB power supply flag to "1", and specifies settings such that USB power supply is enabled (ON) as well as setting the selected power supply mode (S7). Then, after the computer 101 is turned off, USB power supply starts in the power supply mode set at S7.

On the other hand, when it is determined that the USB device information is not present (No at S4), the computer 101 cannot determine an optimum power supply mode for the USB device 111 connected thereto. In this case, the embedded controller 106 specifies settings such that USB power supply is disabled (OFF) (S8).

As described above, according to the embodiment, an optimum power supply mode can be selected for the USB device 111 based on the information stored in the USB power supply mode DB 10440 without bothering the user. Thus, even a user who does not have technical knowledge about USB can supply power from the computer 101 to the USB device 111 with simple operation and without troublesome work. This increases convenience for the user.

A description will then be given of the operation of the computer 101 when the USB device 111 is disconnected therefrom with reference to FIG. 6.

When the USB device 111 is disconnected from the USB port 110 and thereby disconnected from the computer 101, the USB controller 105 detects the event (S20). Then, the computer 101 determines whether the USB power supply flag stored in the storage module 1044 indicates "1" to determine whether USB power supply is set enabled (S21). When determining that USB power supply is set enabled (Yes at S21), the computer 101 determines whether power has been supplied to the disconnected USB device 111 (S22). Having determined that power has been supplied to the disconnected USB device 111 (Yes at S22), the computer 101 sets the USB power supply flag stored in the storage module 1044 to "0". Then, the embedded controller 106 disables USB power supply to the USB port 110 (S23). When it is determined that USB power supply is set disabled (No at S21), or that power has not been supplied to the disconnected USB device 111 (No at S22), the process ends.

As described above, according to the embodiment, USB power supply to the USB port 110 is automatically disabled after the USB device 111 to which power has been supplied is disconnected from the computer 101. Thus, wasteful power consumption can be prevented without bothering the user.

The program executed on the computer 101 may be stored in a computer connected via a network such as the Internet so that it can be downloaded therefrom via the network. The program may also be provided as being stored in a computer-readable storage medium, such as a compact disk read-only memory (CD-ROM), a flexible disk (FD), a compact disc-recordable (CD-R), or a digital versatile disc (DVD), in an installable or executable format.

In the above embodiment, the USB power supply mode DB 10440 may be updatable. For example, the USB power supply mode DB 10440 may be updated partially or entirely with data downloaded from an external computer connected via a network such as the Internet. Besides, at S4 in FIG. 5, when the USB power supply mode DB 10440 does not store the USB device information and the power supply mode, the computer 101 may request the external computer to transmit them. In this case, the USB device information and the power supply mode received from the external computer can be stored in the USB power supply mode DB 10440. With this configuration, information on power supply mode to be selected can be stored in the USB power supply mode DB 10440 as needed even with respect to new USB devices. This further increases convenience for the user.

While the USB power supply mode DB 10440 is described above as storing USB device information that identifies a USB device and an optimum power supply mode to supply power to the USB device in association with each other, this is by way of example and not of limitation. For example, the USB device 111 may store identification information such as the model number, the manufacturer, etc., such that the USB power supply mode DB 10440 can store the identification information and an optimum power supply mode in association with each other. In this case, the power supply controller 1043 can select an optimum power supply mode based on the identification information.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processor configured to supply power to an external device, comprising:
   a connector configured to connect the external device to the information processor;
   memory configured to store identification information associating the external device and a power supply mode, the power supply mode associated with a combination to set to either ON state or OFF state control signals for components of the information processor which causes the external device to be charged;
   a receiver configured to receive the identification information from the external device connected to the information processor; and
   a power supply controller configured to set to either the ON state or the OFF state the control signals for the components according to the power supply mode when the power supply mode associated with the identification information is stored in the memory and configured to disable power supply to the connector when the power supply mode associated with the identification information is not found in the memory.

2. The information processor of claim 1, wherein the power supply controller is configured to disable power supply to the connector when the external device is disconnected from the information processor.

3. The information processor of claim 2, further comprising an updater configured to store the identification information and the power supply mode from a second information processor in the memory.

4. A power supply method for an information processor, the information processor comprising a connector configured to connect an external device to the information processor, a memory configured to store identification information associating the external device and a power supply mode, the power supply mode associated with a condition of components of the information processor which causes the external device to be charged, a receiver, and a power supply controller, the power supply method comprising:
   receiving, by the receiver, the identification information from the external device connected to the information processor; and
   setting, by the power supply controller, to either the ON state or the OFF state control signals for the components according to the power supply mode when the power supply mode associated with the identification information is stored in the memory and disabling power supply to the connector when the power supply mode associated with the identification information is not found in the memory.

* * * * *